(12) United States Patent
Yang et al.

(10) Patent No.: US 12,166,941 B2
(45) Date of Patent: Dec. 10, 2024

(54) PICTURE ENCRYPTION METHOD AND APPARATUS, COMPUTER DEVICE, STORAGE MEDIUM AND PROGRAM PRODUCT

(71) Applicant: Tencent Technology (Shenzhen) Company Limited, Shenzhen (CN)

(72) Inventors: Weiming Yang, Shenzhen (CN); Huizhong Tang, Shenzhen (CN); Shaoming Wang, Shenzhen (CN); Runzeng Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 319 days.

(21) Appl. No.: 17/941,395

(22) Filed: Sep. 9, 2022

(65) Prior Publication Data

US 2023/0007143 A1 Jan. 5, 2023

Related U.S. Application Data

(63) Continuation of application No. PCT/CN2021/125894, filed on Oct. 22, 2021.

(30) Foreign Application Priority Data

Nov. 19, 2020 (CN) .......................... 202011306972.5

(51) Int. Cl.
*G06V 10/44* (2022.01)
*G06V 10/774* (2022.01)
*H04N 1/32* (2006.01)

(52) U.S. Cl.
CPC ......... *H04N 1/32272* (2013.01); *G06V 10/44* (2022.01); *G06V 10/774* (2022.01)

(58) Field of Classification Search
None
See application file for complete search history.

(56) References Cited

U.S. PATENT DOCUMENTS

2017/0249534 A1* 8/2017 Townsend .............. G06V 10/82
2019/0197321 A1* 6/2019 Hughes .................. G06V 40/10
(Continued)

OTHER PUBLICATIONS

Extended European Search Report for International Patent Application No. PCT/CN2021/125894 dated Apr. 26, 2024, 9 pages.
(Continued)

*Primary Examiner* — Joshua Joo
(74) *Attorney, Agent, or Firm* — Crowell & Moring LLP

(57) ABSTRACT

Disclosed are a picture encryption method and apparatus, a computer device, a storage medium and a program product. The method includes: acquiring N pictures having a time sequence, N being an integer equal to or greater than 2; performing feature extraction on the N pictures to acquire a picture feature of each of the N pictures; successively performing target prediction on the N pictures according to the time sequence to obtain prediction information of the each of the N pictures, the target prediction referring to a prediction on the each of the N pictures based on status information, and the status information being information which is updated based on picture features of pictures that have been predicted; and encrypting the N pictures based on the prediction information of the each of the N pictures.

20 Claims, 9 Drawing Sheets

(56) References Cited

U.S. PATENT DOCUMENTS

2019/0251360 A1    8/2019   Cricri et al.
2022/0121734 A1*   4/2022   Nakamura ................ G06T 7/00
2023/0154192 A1*   5/2023   Zu ........................ G06V 10/225
                                                                                                  382/103

OTHER PUBLICATIONS

Imran et al. "Robust, efficient and privacy-preserving violent activity recognition in videos." In Proceedings of the 35th annual ACM symposium on applied computing, Mar. 30, 2020, 8 pages.

* cited by examiner

PICTURE ENCRYPTION METHOD AND APPARATUS, COMPUTER DEVICE, STORAGE MEDIUM AND PROGRAM PRODUCT

RELATED APPLICATION

This application is a continuation application of PCT Patent Application No. PCT/CN2021/125894, filed on Oct. 22, 2021, which claims priority to Chinese Patent Application No. 202011306972.5, filed with the China National Intellectual Property Administration, PRC on Nov. 19, 2020, each of which is incorporated herein by reference in its entirety.

FIELD OF THE TECHNOLOGY

Embodiments of this disclosure relate to the technical field of artificial intelligence, and in particular, to a picture encryption method and apparatus, a computer device, a storage medium and a program product.

BACKGROUND OF THE DISCLOSURE

Nowadays, with increasing development of artificial intelligence, application of the artificial intelligence technology is more and more extensive in life, including application in the face recognition technology. Face recognition can be applied to payment scenarios to realize "face swiping" payment.

In related art, in order to guarantee the safety of face swiping data acquired by face swiping, it is usually necessary to encrypt the face swiping data. A common encryption method encrypts the face swiping data by adopting an asymmetric algorithm according to a certain encryption format, where the encryption format is usually introduction of a timestamp of the face swiping data or a counter.

However, encryption of the face swiping data by adopting the above-mentioned solution will lead to a condition that the encryption format of the face swiping data is easily cracked, resulting in poor safety of the face swiping data.

SUMMARY

Embodiments of this disclosure provide a picture encryption method and apparatus, a computer device, a storage medium and a program product, so as to improve the safety of picture encryption. The technical solution is as follows:

according to one aspect, a picture encryption method is provided. The method is executed by a computer device, the method including:

acquiring N first pictures having a time sequence, where N is an integer equal to or greater than 2;

performing feature extraction on the N first pictures to acquire picture features of the N first pictures;

successively performing target prediction on the N first pictures according to the time sequence to obtain prediction information of the N first pictures, where the target prediction refers to prediction on the first pictures based on status information, and the status information is information for updating based on the picture features of the first pictures that have been predicted; and encrypting the N first pictures based on the prediction information of the N first pictures.

According to another aspect, a picture encryption apparatus is provided. The apparatus includes:

a picture acquisition module configured to acquire N first pictures having a time sequence, where N is an integer equal to or greater than 2;

a feature extraction module configured to perform feature extraction on the N first pictures to acquire picture features of the N first pictures;

an information output module configured to successively perform target prediction on the N first pictures according to the time sequence to obtain prediction information of the N first pictures, where the target prediction refers to prediction on the first pictures based on status information, and the status information is information for updating based on the picture features of the first pictures that have been predicted; and a picture encryption module configured to encrypt the N first pictures based on the prediction information of the N first pictures.

In a possible implementation, the information output module includes:

an information output sub-module configured to successively input the picture features of the N first pictures into a recurrent network in an image prediction model according to the time sequence to obtain the prediction information of the N first pictures outputted by the recurrent network.

In a possible implementation, the apparatus further includes:

an picture segment acquisition module configured to, through a partitioning network in the image prediction model, perform partitioning processing on the N first pictures according to a size of a target window to acquire M first picture segments corresponding to the N first pictures before the performing feature extraction on the N first pictures to acquire picture features corresponding to the N first pictures, where M is an integer equal to or greater than 1, and the size of the target window is a network parameter of the partitioning network; and the feature extraction module includes:

a feature extraction sub-module configured to perform feature extraction on the M first picture segments of the N first pictures based on attention weights of the M first picture segments to obtain picture features of the N first pictures.

In a possible implementation, the prediction information includes prediction sub-information of the M first picture segments of the corresponding first pictures, the prediction sub-information being used for indicating prediction results of the first picture segments.

In a possible implementation, the feature extraction sub-module includes:

a feature preprocessing unit for preprocessing the M first picture segments of a target picture to obtain preprocessed features of the M first picture segments of the target picture, where the target picture is any one of the N first pictures; and a target feature acquisition unit for inputting the preprocessed features of the M first picture segments of the target picture into an image feature extraction network in the image prediction model to obtain the picture feature of the target picture outputted by the image feature extraction network, where the image feature extraction network includes an attention mechanism layer used for processing the preprocessed features of the M first picture segments by taking the attention weights of the M first picture segments as parameters.

In a possible implementation, the feature preprocessing unit is configured to:

acquire a gray value of a target picture segment, where the target picture segment is any one of the M first picture segments corresponding to the target picture;

acquire first type feature information of the target picture segment based on fast Fourier transform of a first order of magnitude; and combine the gray value of the target picture segment with the first type feature information of the target picture block to obtain a preprocessed feature of the target picture segment.

In a possible implementation, the first type feature information includes:

at least one of energy distribution feature information, high and low frequency distribution feature information, flatness feature information and spectral centroid feature information of an image frequency spectrogram.

In a possible implementation, the apparatus further includes:

a training data acquisition module configured to acquire training data before acquiring N first pictures with a time sequence, where the training data includes K picture samples having a time sequence and annotated information of the K picture samples, K being an integer equal to or greater than 2;

a sample feature extraction module configured to perform feature extraction on the K picture samples to acquire picture features corresponding to the K picture samples;

a sample prediction information acquisition module configured to successively input the picture features corresponding to the K picture samples into the recurrent network in the image prediction model according to the time sequence to obtain the prediction information of the K picture samples outputted by the recurrent network;

a sample prediction result acquisition module configured to acquire prediction results of the K picture samples based on the prediction information of the K picture samples;

a loss function value acquisition module configured to acquire a loss function value based on the prediction results of the K picture samples and the annotated information of the K picture samples; and a model updating module configured to update the image prediction model based on the loss function value.

In a possible implementation, the model updating module includes:

a parameter updating sub-module configured to perform parameter updating on at least one network of the recurrent network, the partitioning network and the image feature extraction network based on the loss function value.

In a possible implementation, the recurrent network includes:

at least one of a bi-directional gated recurrent unit (BGRU), a gated recurrent unit (GRU) and a long short term memory (LSTM) network.

In a possible implementation, the picture encryption module includes:

a picture encryption sub-module configured to splice the N first pictures with the corresponding prediction information to generate encrypted picture data of the N first pictures.

In a possible implementation, all or part of pictures in the N first pictures include face images.

In a possible implementation, the prediction information is used for indicating whether the first pictures include the face images with image qualities satisfying quality conditions.

According to another aspect, a computer device is provided, including a processor and a memory, the memory storing at least one instruction, at least one program, a code set, or an instruction set, and the at least one instruction, the at least one program, the code set or the instruction set being loaded and executed by the processor to implement the foregoing picture encryption method.

According to another aspect, a non-transitory computer-readable storage medium is provided, the non-transitory storage medium storing at least one instruction, at least one program, a code set or an instruction set, the at least one instruction, the at least one program, the code set or the instruction set being loaded and executed by a processor to implement the foregoing picture encryption method.

According to an aspect of this application, a computer program product or a computer program is provided, the computer program product or the computer program including computer instructions, the computer instructions being stored in a non-transitory computer-readable storage medium. A processor of a computer device reads the computer instructions from the non-transitory computer-readable storage medium, and executes the computer instructions, so that the computer device performs the picture encryption method provided in the various optional implementations of the foregoing aspects.

The technical solutions provided in this application may include the following beneficial effects:

After the first pictures having the time sequence are subjected to feature extraction, the first pictures are subjected to target prediction to obtain the prediction information corresponding to the first pictures, and the first pictures are encrypted based on the prediction information corresponding to the first picture. Prediction is performed through the updated status information of the picture features of the first pictures that has been predicted, so as to obtain current prediction information that predicts the picture features of the first pictures. Through the above-mentioned solution, the prediction information of the first pictures is affected by considering relevance of the picture features of the first pictures in time dimension, so that a condition that a first image is easily cracked for an encryption format only introducing a non-neural network safety factor is avoided, and therefore, the safety of the encrypted first image is also improved while the encryption format that encrypts the first pictures is expanded.

It is to be understood that the above general descriptions and the following detailed descriptions are merely for exemplary and explanatory purposes, and cannot limit this application.

BRIEF DESCRIPTION OF THE DRAWINGS

The accompanying drawings herein, which are incorporated into the specification and constitute a part of this specification, show embodiments that conform to this disclosure, and are used for describing a principle of this application together with this specification.

DESCRIPTION OF EMBODIMENTS

Exemplary embodiments are described in detail herein, and examples thereof are shown in the accompanying drawings. When the following descriptions are made with reference to the accompanying drawings, unless otherwise indicated, the same numbers in different accompanying drawings represent the same or similar elements. The following implementations described in the following exemplary embodiments do not represent all implementations that are consistent with this application. Instead, they are merely examples of apparatuses and methods consistent with aspects related to this application as recited in the appended claims.

"Several" mentioned herein refers to one or more, and "more" refers to two or more than two. And/or describes an association relationship for describing associated objects and represents that three relationships may exist. For example, A and/or B may represent the following three cases: Only A exists, both A and B exist, and only B exists. The character "/" generally indicates an "or" relationship between the associated objects.

The solutions shown in the embodiments of this disclosure may be implemented in a process of, for example, face swiping payment, by virtue of artificial intelligence (AI).

Face recognition is a bioidentification technology for identity recognition based on feature information of a human face. Face recognition acquires, by using a vidicon or a camera, an image or a video stream that includes a human face, and automatically detects and tracks the human face in the image, so as to further perform a series of related application operations on the detected face image. It technically includes image acquisition, feature localization, identity verification and searching.

After face pictures of a user having the time sequence are acquired, by way of feature extraction, the prediction information corresponding to the face pictures is outputted by the recurrent network, and the face pictures are encrypted based on the prediction information corresponding to the face pictures, so that the safety of the encrypted face image is improved. In one example, each of the face pictures may be encrypted using the prediction information of all the face pictures (of different persons), to at least introduce more randomness.

The solutions provided in the embodiments of this disclosure involve technologies such as face recognition and machine learning of AI, and are specifically described by using the following embodiments.

Figure 1:
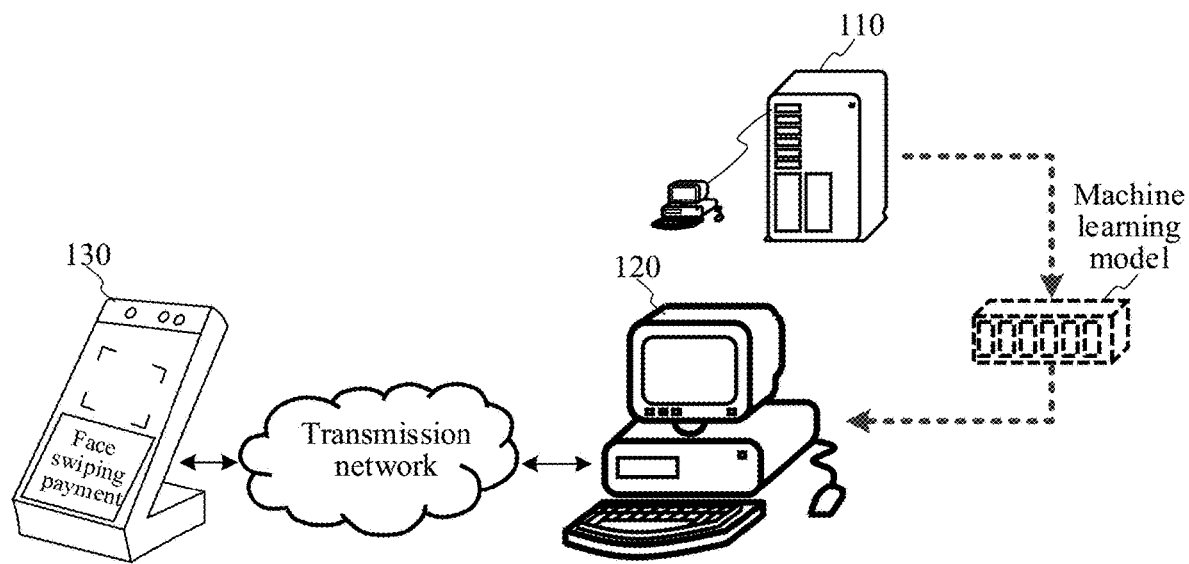
FIG. 1 is a schematic diagram of a picture encryption system according to an exemplary embodiment.

The solutions of the embodiments of this disclosure include a model training stage and an image processing stage. FIG. 1 is a schematic diagram of a face picture encryption system according to an exemplary embodiment. As shown in FIG. 1, in the model training stage, a model training device 110 trains inputted each group of picture samples to obtain a machine learning model, and in the image processing stage, an image processing device 120 may output the prediction information corresponding to the group of first pictures according to the trained machine learning model and the inputted to-be-encrypted each group of first pictures, and perform data packing on the prediction information and the group of first pictures in a certain data format, so as to complete encryption of the group of first pictures.

The above-mentioned model training device 110 and the image processing device 120 may be computer devices with a machine learning capability. For example, the computer device may be a fixed computer device such as a personal computer, a server, and a fixed scientific research device; and alternatively, the computer device may be a mobile computer device such as a tablet computer and an e-book reader.

In a possible implementation, the model training device 110 and the image processing device 120 may be the same device; and alternatively, the model training device 110 and the image processing device 120 may be different devices. Moreover, when the model training device 110 and the image processing device 120 are different devices, the model training device 110 and the image processing device 120 may be devices of the same type. For example, the model training device 110 and the image processing device 120 may both be personal computers; and alternatively, the model training device 110 and the image processing device 120 may also be devices of different types. For example, the model training device 110 may be a server, and the image processing device 120 may be a fixed scientific research device, or the like. Specific types of the model training device 110 and the image processing device 120 are not limited in the embodiments of this disclosure.

The face picture acquisition terminal 130 may be a smartphone, a tablet computer, a laptop computer, a desktop computer, a cash device or the like having a face image recognition function, but is not limited thereto.

For example, the picture acquisition terminal 130 is a face acquisition terminal, and the face acquisition terminal may be a terminal having a face recognition function.

The image processing device 120 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

In a possible implementation, the face picture encryption system is applied to an intelligent payment platform, where the picture acquisition terminal 130 may be a face acquisition terminal, for example, a large screen self-assisted cash device. When the user uses the large screen self-assisted cash device, the large screen self-assisted cash device may acquire face videos of the user within a period of time. The face videos include several face pictures having a time sequence, the face pictures may be pictures including face images and are uploaded to the image processing device 120 via a transmission network. The image processing device 120 performs feature extraction and operation on the face pictures having the time sequence through the machine learning model, and finally outputs the prediction information corresponding to the face pictures, and encrypts the face pictures and the corresponding prediction information in an appointed data format, so as to generate the encrypted face image.

The face picture acquisition terminal 130 and the image processing device 120 are connected through a communication network. Optionally, the communication network is a wired network or a wireless network.

Optionally, the wireless network or the wired network uses a standard communication technology and/or protocol. The network is usually the Internet, but may alternatively be any other networks, including but not limited to a local area network (LAN), a metropolitan area network (MAN), a wide area network (WAN), a mobile, wired, or wireless network, or any combination of a dedicated network or a virtual dedicated network). In some embodiments, technologies and/or formats, such as HyperText Markup Language (HTML) and extensible markup language (XML), are used for representing data exchanged through a network. In addition, all or some links may be encrypted by using conventional encryption technologies such as a secure socket layer (SSL), transport layer security (TLS), a virtual private network (VPN), and internet protocol security (IPsec). In other embodiments, custom and/or dedicated data communication technologies may also be used in place of or in addition to the foregoing data communication technologies. This is not limited in this application.

Figure 2:
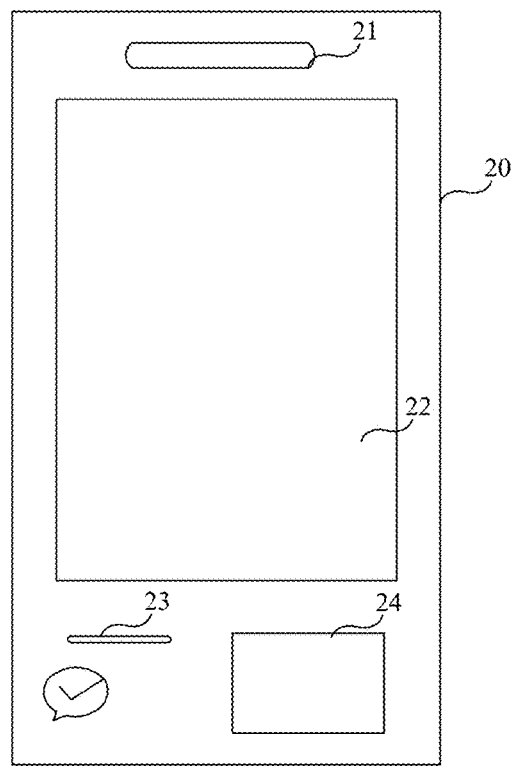
FIG. 2 is a schematic diagram of a face acquisition terminal according to an example embodiment.

The embodiments of this disclosure may be applied to scenarios for encrypting face pictures. The first pictures are acquired by the face acquisition terminal. When the face recognition technology is applied to intelligent payment, the face acquisition terminal acquires the face images. FIG. 2 is a schematic diagram of a face acquisition terminal according to an exemplary embodiment. As shown in FIG. 2, the face acquisition terminal 20 includes a camera component 21, a display screen 22, a certificate printing area 23 and a commodity scanning area 24.

The camera component 21 may acquire the face image of the user, and the display screen 22 may display the acquired face image and an acquisition result.

In the payment process, the user may input commodity information of a to-be-paid commodity in the commodity scanning area 24 and then start a flow of face recognition payment.

The display screen 22 may support display of interface information and may be touched by the user to operate.

Figure 3:
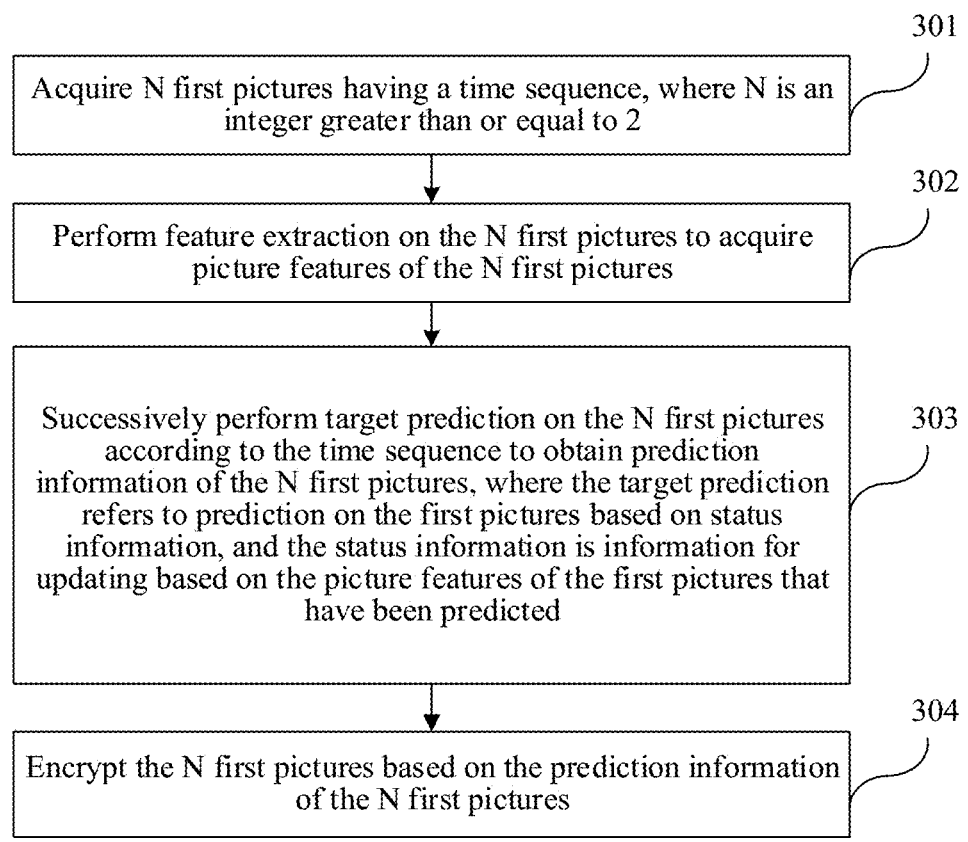
FIG. 3 is a flowchart of a picture encryption method according to an exemplary embodiment.

FIG. 3 is a flowchart of a picture encryption method according to an exemplary embodiment. The picture encryption method may be executed by a computer device. The computer device may be either a terminal or a server; and alternatively, the computer device may include the terminal and the server. For example, the above-mentioned computer device may be the image processing device 120 shown in FIG. 1. As shown in FIG. 3, the picture encryption method includes the following steps:

In S301, N first pictures having a time sequence are acquired, where N is an integer equal to or greater than 2.

In the embodiments of this disclosure, the computer device acquires an image video uploaded by the picture acquisition terminal within an appointed period of time and acquires the N first pictures arranged according to the time sequence from the image video. N is an integer greater than or equal to 2.

In a possible implementation, time intervals among the N first pictures having the time sequence are identical.

The computer device may acquire each frame of face picture in the image video as the N first pictures.

In S302, feature extraction is performed on the N first pictures to acquire picture features of the N first pictures.

In the embodiments of this disclosure, the computer device performs feature extraction on the acquired N first pictures to acquire picture features of the N first pictures.

The computer device may perform feature extraction on the N first pictures through an image feature extraction network in the trained image prediction model to acquire picture features corresponding to the N first pictures.

In a possible implementation, the image prediction model is a neural network model trained by a gradient descent algorithm by taking a cross entropy as a loss function based on a TensorFlow machine learning library.

Feature extraction on the N first pictures may be performed by the image feature extraction network in the image predication model. The image feature extraction network includes a convolutional layer and a pooling layer.

In S303, target prediction is successively performed on the N first pictures according to the time sequence to obtain prediction information of the N first pictures, where the target prediction refers to prediction on the first pictures based on status information, and the status information is information which is updated based on the picture features of the first pictures that have been predicted. In example implementations, the status information may be a combination of picture features of pictures that have been predicted. Therefore, the status information is updated with each prediction iteration and is correlated with history prediction results. In example implementations, the already predicted pictures may each correspond to different persons (e.g., each predicted picture include a facial image of a different person). Therefore, the status information may be a mixture/combination of picture features corresponding to different persons.

In the embodiments of this disclosure, the computer device may successively perform target prediction on the N first pictures according to the time sequence to obtain the prediction information of the N first pictures.

The picture features corresponding to the N first pictures obtained by feature extraction are successively inputted into a recurrent network in an image prediction model according to the time sequence of the N first pictures and are calculated by the recurrent network to output the prediction information of the N first pictures.

Optionally, the target prediction refers to prediction on the first pictures based on current status information, and the current status information is information which is updated based on the picture features of pictures that have been predicted.

The recurrent network can be added into the image prediction model behind the image feature extraction network. The status information of the current recurrent network may be determined according to the picture features of face pictures that have been inputted. The computer device may predict the currently inputted picture features according to the status information of the current recurrent network and output a prediction result.

In S304, the N first pictures are encrypted based on the prediction information of the N first pictures.

In the embodiments of this disclosure, the computer device may process the first pictures based on the prediction information of the N first pictures, so as to encrypt the N first pictures.

The computer device may encrypt the N first pictures of a human based on the outputted prediction information after the picture features of the N first pictures are inputted into the recurrent network.

In a possible implementation, the prediction information corresponding to the N first pictures is combined with picture data of the N first pictures according to an appointed data structure, so as to generate the encrypted N first pictures.

In conclusion, after the first pictures having the time sequence are subjected to feature extraction, the first pictures are subjected to target prediction to obtain the prediction information corresponding to the first pictures, and the first pictures are encrypted based on the prediction information corresponding to the first picture. Prediction is performed through the updated status information of the picture features of the pictures that has been predicted, so as to obtain current prediction information that predicts the picture features of the first pictures. Through the above-mentioned solution, the prediction information of the first pictures is affected by considering relevance of the picture features of the first pictures in time dimension, so that a condition that a first image is easily cracked for an encryption format only introducing a non-neural network safety factor is avoided, and therefore, the safety of the encrypted first image is also improved while the encryption format that encrypts the first pictures is expanded.

Figure 4:
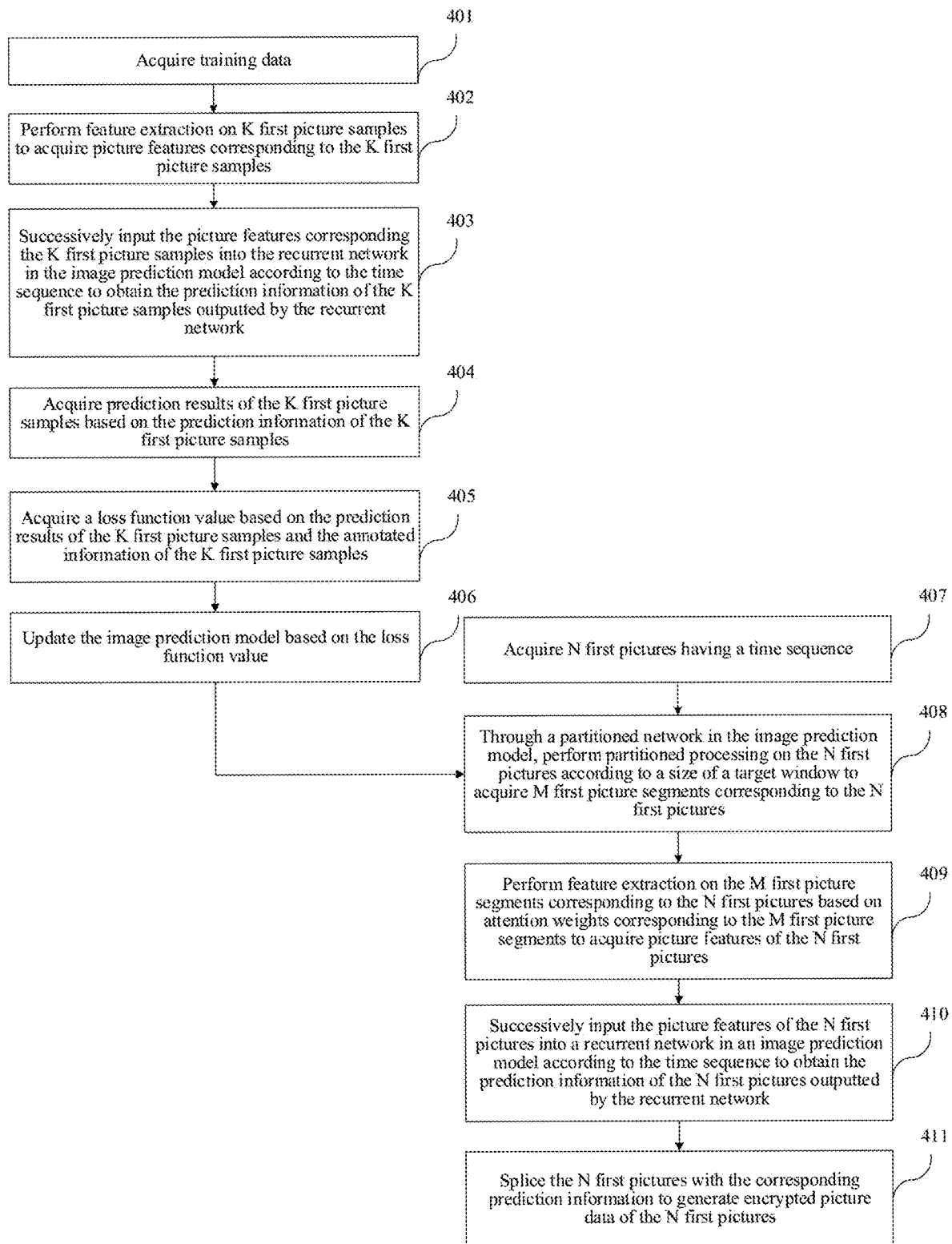
FIG. 4 is a schematic flowchart of a picture encryption method according to an exemplary embodiment.

FIG. 4 is a flowchart of a picture encryption method according to an exemplary embodiment. The picture encryption method may be executed by a computer device. The computer device may be either a terminal or a server; and alternatively, the computer device may include the terminal and the server. For example, the above-mentioned computer device may be the image processing device 120 shown in FIG. 1. As shown in FIG. 4, the picture encryption method includes the following steps:

In S401, training data is acquired.

In the embodiments of this disclosure, the model training device acquires the training data for model training.

The training data includes K picture samples having a time sequence and annotated information of the K picture samples.

The annotated information may be used for indicating whether the first pictures include a target object or the first pictures include the target object with the image quality satisfying a quantity condition. The annotated information may further be a label of the picture including the target object.

In a possible implementation, the first pictures are images in each video acquired by the face acquisition device.

For example, with respect to a condition that the sample is the face image, the face acquisition device may acquire multiple segments of face images, and the multiple segments of face images include half of positive sample face images and half of negative sample face images. Each frame of face pictures included in the face images as the positive sample face images is the face picture with the image quality satisfying the quality condition. Each frame of face pictures included in the face images as the negative sample face images is not the face picture or is the face image with the image quality dissatisfying the quality condition. The acquired training data is preprocessed, namely, data cleaning is performed, so as to screen out invalid face pictures in the training data.

The invalid face pictures may be face pictures, where face data in the pictures cannot be extracted due to too dark or black pictures.

In S402, feature extraction is performed on the K picture samples to acquire picture features corresponding to the K picture samples.

In the embodiments of this disclosure, the computer device for model training may perform feature extraction on the K picture samples to acquire picture features corresponding to the K picture samples.

In a case that the first picture sample is a face image sample, the computer device for model training may perform partitioning processing on the K face picture samples to acquire L face picture segment samples corresponding to the K face picture samples, and perform feature extraction on the L face picture segment samples of the K face pictures based on the attention weights corresponding to the L face picture segment samples to acquire the picture features corresponding to the K face pictures.

K is an integer greater than or equal to 2. L is a positive integer equal to or greater than 1.

Exemplarily, the computer device partitions the face picture samples in the face image samples according to various sizes of windows, converts RGB three-colored face picture segment samples into gray face picture segment samples, then performs feature information extraction at different orders of magnitudes of fast Fourier transform to acquire at least one of energy distribution feature information, high and low frequency distribution feature information, flatness feature information and spectral centroid feature information of the image frequency spectrogram corresponding to the face picture segment samples, splices the gray values of the face picture segment samples with the correspondingly acquired appointed type feature information, inputs the spliced gray value and feature information into an input layer of the image prediction model, and performs feature extraction on the face picture segment samples through the convolutional layer, the pooling layer and the attention mechanism layer, so as to acquire the picture features corresponding to the K face pictures.

In S403, the picture features corresponding to the K picture samples are successively inputted into the recurrent network in the image prediction model according to the time sequence to obtain the prediction information of the K picture samples outputted by the recurrent network.

In the embodiments of this disclosure, the computer device successively inputs the picture features corresponding to the K picture samples into the recurrent network in the image prediction model according to the time sequence to obtain the prediction information of the K picture samples outputted by the recurrent network based on the status information at the moment.

In a case that the first picture sample is the face image sample, the computer device successively inputs the picture features corresponding to the K face picture samples outputted by the image feature extraction network into the recurrent network in the image prediction model according to the time sequence to obtain the prediction information of the K face picture samples outputted by the recurrent network.

The prediction information is used for indicating the prediction results of the corresponding face picture samples;

and the recurrent network is a network that predicts the inputted picture features through the status information, and the status information is information for updating based on the picture features of the face picture samples that have been inputted.

In a possible implementation, the L face picture segment samples corresponding to the K face picture samples are successively inputted into the recurrent network according to the time sequence, so as to output the prediction information corresponding to the K face picture samples, where the prediction information corresponding to the face picture samples is a vector of the prediction result including L face picture segment samples.

In a possible implementation, the recurrent network includes at least one of a bidirectional gated recurrent unit (BGRU), a gated recurrent unit (GRU) and a long short term memory (LSTM) network.

Figure 5:
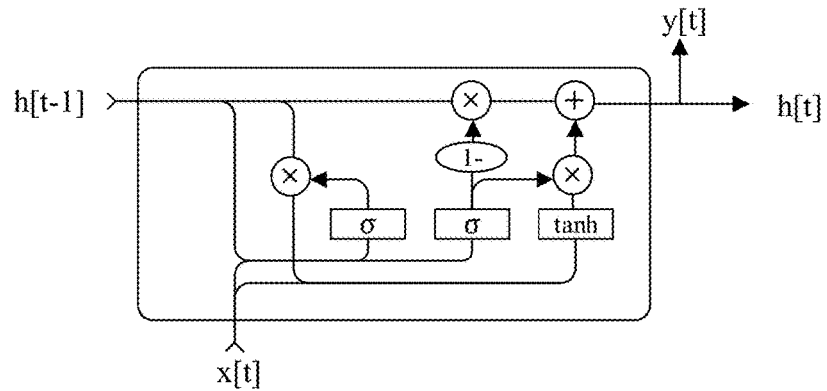
FIG. 5 is a schematic structural diagram of a BGRU involved in an exemplary embodiment shown in FIG. 4.

For example, FIG. 5 is a schematic structural diagram of a BGRU involved in an embodiment of this application. As shown in FIG. 5, the BGRU is a common bi-directional gated recurrent neural network, where its input is the picture feature x[t] inputted at the current moment and a hidden status h[t−1] at a previous moment, namely, the outputted prediction result y[t] will be affected by the picture feature inputted at the current moment t and the hidden status at the previous moment t−1.

In S404, prediction results of the K picture samples are acquired based on the prediction information of the K picture samples.

In the embodiments of this disclosure, the computer device may acquire whether the K picture samples include the target object with the image quality satisfying the quality condition according to the prediction information of the K picture samples.

In a case that the first picture sample is the face image sample, the computer device may determine whether the group of training samples are the target face pictures according to the prediction information of the K face picture samples. The target face pictures may face images with image qualities satisfying quality conditions.

In S405, a loss function value is acquired based on the prediction results of the K picture samples and the annotated information of the K picture samples.

In a possible implementation, the computer device counts the prediction results of the K picture samples, and determines the loss function value of the model according to whether the indicated prediction results include the target object and whether the pre-annotated information of the K picture samples include the target object.

In a case that the first picture sample is the face image sample, the computer device counts the prediction results of the K face picture samples, and determines the loss function value of the model according to whether the prediction results are predicted as the target face and whether the pre-annotated information of the K picture samples is the target face.

In S406, the image prediction model is updated based on the loss function value.

In the embodiments of this disclosure, the computer device updates model parameters in the image prediction model based on the calculated loss function value till the model training is completed.

In a possible implementation, parameter updating is performed on at least one network of the recurrent network, the partitioning network and the image feature extraction network based on the loss function value.

The updated model parameters include, but not limited to, the attention weights and the sizes of the target windows.

In a possible implementation, after the image prediction model is trained, model evaluation on the image prediction model is performed through a test set.

In a case that the first picture sample is the face image sample, the computer device may convert each group of face pictures into each group of gray pictures by acquiring each group of face pictures in the test set, then partition each group of gray pictures, extract feature information of each group of gray pictures, predict the several partitioned face picture segments subjected to feature extraction through the recurrent network, and count the prediction results of face picture segments by adopting a voting method. If the face picture segment is predicted as the target face, a vote is casted to the positive sample, and otherwise, a vote is casted to the negative sample.

In S407, N first pictures having a time sequence are acquired.

In the embodiments of this disclosure, the N first pictures having the time sequence are acquired by an image acquisition device.

In a possible implementation, all or part of pictures in the N first pictures include the face images, and the prediction information is used for indicating whether the first pictures include the face images with image qualities satisfying quality conditions.

That is to say, the image acquisition device may be a face acquisition device, and the first pictures may be face pictures.

In a possible implementation, the face acquisition device acquires the face images within an appointed period of time and uploads them to the server, and the server acquires N face pictures from the face images, where N is an integer equal to or greater than 2.

The appointed period of time may be either a preset duration or a duration determined by the face acquisition terminal according to a face recognition condition.

Exemplarily, a developer may directly set the duration during which the face acquisition terminal acquires the face images to be 5 s. When the face acquisition terminal starts to acquire the face images for 5 s, the acquired 5 s face images are uploaded to the server; and alternatively, the face acquisition terminal determines the acquisition duration according to the qualities of the currently acquired face images, and the qualities of the face images acquired by the face acquisition terminal are negatively correlated to the acquisition duration.

Acquisition of the N face pictures from the face images may be acquisition by taking a frame as a unit, namely, the N face pictures include each frame of face picture in the acquired face images.

In a possible implementation, the N face pictures are face pictures successively acquired according to the time sequence in a process of face recognition at a single time.

Figure 6:
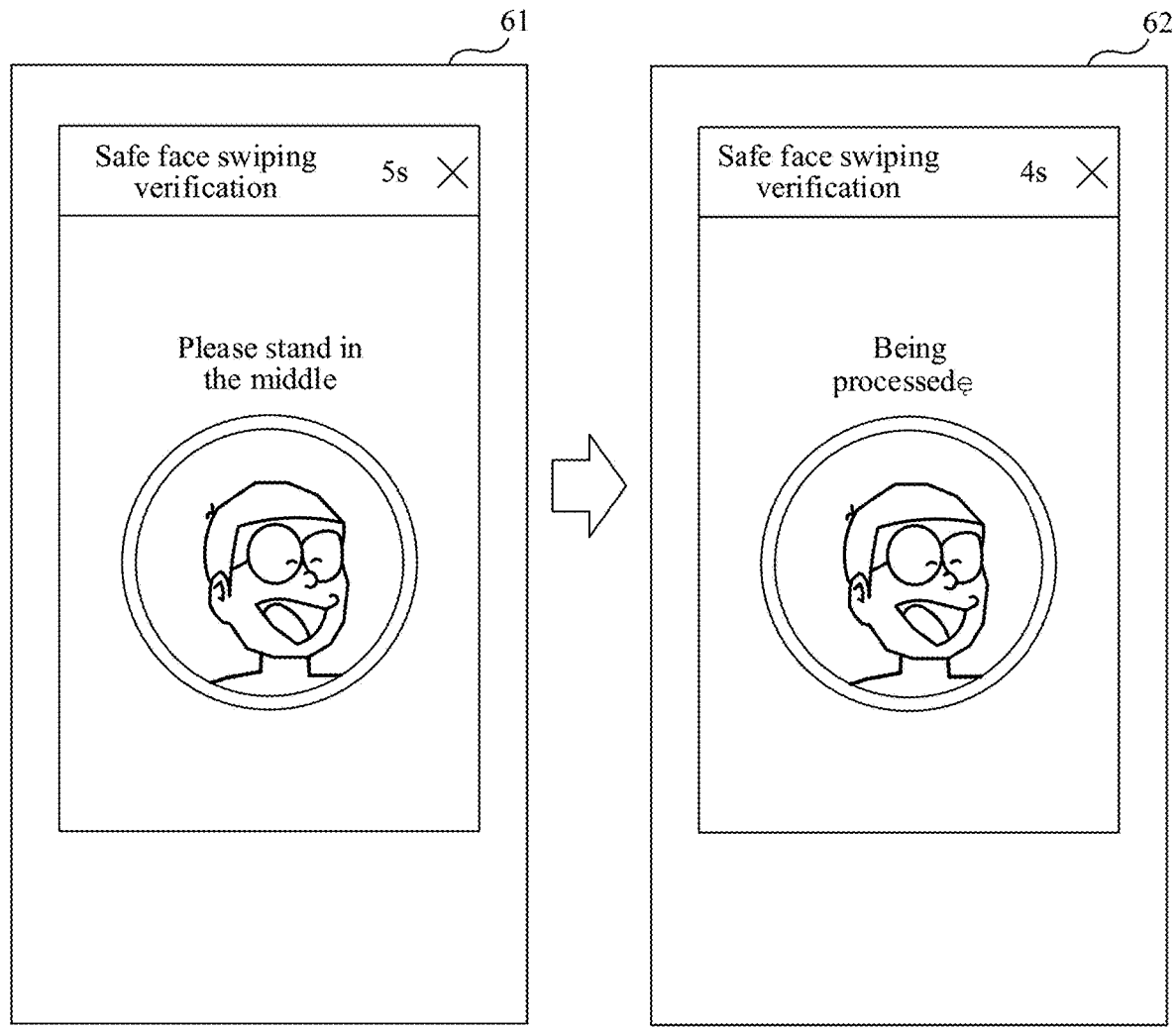
FIG. 6 is a schematic diagram of continuous time face image acquisition involved in the exemplary embodiment shown in FIG. 4.

For example, FIG. 6 is a schematic diagram of continuous time face image acquisition involved in an embodiment of this application. As shown in FIG. 6, when the user faces the face acquisition terminal, the face acquisition terminal displays a first status picture 61 to remind the user to adjust. When the face acquisition terminal starts to perform face image acquisition, the face acquisition terminal displays a second status picture 62. There is a countdown indication in the display area, and when countdown is completed, the N face pictures are acquired completely.

In S408, through a partitioning network in the image prediction model, partitioning processing is performed on the N first pictures according to a size of a target window to acquire M first picture segments corresponding to the N first pictures.

In the embodiments of this disclosure, the computer device may partition the N first pictures according to the target window through the partitioning network by inputting the N first pictures into the partitioning network in the image prediction module to obtain the M first picture segments corresponding to the N first pictures.

M is an integer equal to or greater than 1; and the size of the target window may be a network parameter of the partitioning network.

In a possible implementation, the size of the target window is a model parameter updated in the training stage of the image prediction model.

Exemplarily, by taking a condition that the first picture is the face picture as an example, when the size of the target window is 2×2, and if the face picture is a 4×4 picture, the face picture subjected to the partitioning network may be divided into 4 face picture segments.

In S409, feature extraction is performed on the M first picture segments corresponding to the N first pictures based on attention weights corresponding to the M first picture segments to acquire picture features of the N first pictures.

In the embodiments of this disclosure, the computer device may perform feature extraction on the M first picture segments corresponding to the N first pictures based on attention weights corresponding to the M first picture segments to acquire picture features of the N first pictures.

In a possible implementation, the computer device preprocesses the M first picture segments corresponding to the target picture to obtain the preprocessed features of the M first picture segments corresponding to the target picture, and then inputs the preprocessed features of the M first picture segments corresponding to the target picture into the image feature extraction network in the image prediction model to obtain the picture features of the target picture outputted by the image feature extraction network.

Exemplarily, the target picture may be the target face picture when being applied to a scenario for encrypting the face picture.

The target face picture is any one of the N face pictures. The image feature extraction network includes the attention mechanism layer. The attention mechanism layer is used for processing the preprocessed features of the M face picture segments by taking the attention weights of the M face picture segments as parameters.

In a possible implementation, the computer device acquires the gray value of the target picture segment, then acquires the first type feature information of the target picture segment based on fast Fourier transform of first order of magnitude, and combines the gray value of the target picture segment with the first type feature information of the target picture segment to obtain the preprocessed features of the target picture segment.

The target picture segment is any one of the M first picture segments corresponding to the target picture.

Exemplarily, the computer device may input the M first picture segments corresponding to the N first pictures into the image feature extraction network, and perform feature extraction on the M first picture segments through the image feature extraction network to obtain the picture segment features corresponding to the M first picture segments, and the image feature extraction network includes the attention mechanism layer. The attention mechanism layer may be used for distributing the attention weight for the first picture segments. The picture features of the N first pictures corresponding to the M first picture segments are acquired based on the picture segment features.

The image feature extraction network may include the convolutional layer and the pooling layer.

Exemplarily, the first layer of the image prediction model is an input layer, the convolutional layer using 64 convolution kernels (the size of the convolution kernels is 3×3, the stride is 1 and the padding is 1) is taken as a second layer, the pooling layer with windows of 2×2 and stride of 2 is taken as a third layer, the convolutional layer using 128 convolution kernels (the size of the convolution kernels is 3×3, the stride is 1 and the padding is 1) is taken as a fourth layer, the pooling layer with windows of 2×2 and stride of 2 is taken as a fifth layer, the convolutional layer using 256 convolution kernels (the size of the convolution kernels is 3×3, the stride is 1 and the padding is 1) is taken as a sixth layer, the pooling layer with windows of 2×2 and stride of 2 is taken as a seventh layer, a batch normalization layer is added into an eighth layer, and a max pooling layer is added into a ninth layer. The attention mechanism layer may be located in front of the convolutional layer or the pooling layer.

In a possible implementation, the first type feature information includes at least one of energy distribution feature information, high and low frequency distribution feature information, flatness feature information and spectral centroid feature information of an image frequency spectrogram (or spectrum graph).

For example, the computer device may extract the energy distribution feature of the image frequency spectrogram in a case that the order of magnitude of fast Fourier transform (FFT Size) is 4096, and normalize the energy distribution feature of the image frequency spectrogram. The computer device may extract the high and low frequency distribution feature in a case that the order of magnitude of fast Fourier transform (FFT Size) is 2048, and normalize the high and low frequency distribution feature. The computer device may extract the flatness feature in a case that the order of magnitude of fast Fourier transform (FFT Size) is 1024, and normalize the flatness feature. The computer device may extract the spectral centroid feature in a case that the order of magnitude of fast Fourier transform (FFT Size) is 1024, and normalize the spectral centroid feature.

In S410, the picture features of the N first pictures are successively inputted into a recurrent network in an image prediction model according to the time sequence to obtain the prediction information of the N first pictures outputted by the recurrent network.

In the embodiments of this disclosure, the computer device successively inputs the picture features corresponding to the N first pictures outputted by the image feature extraction network into the recurrent network in the image prediction model according to the time sequence to obtain the prediction information of the N first pictures outputted by the recurrent network.

In a possible implementation, the M first picture segments are successively inputted into the recurrent network according to the time sequence of the corresponding N first pictures to obtain the prediction results corresponding to the first picture segments outputted by the recurrent network. The prediction information of the N first pictures is acquired based on the prediction results of the M first picture segments.

The prediction information may be used for indicating the prediction results of the first pictures; and the recurrent network is a network that predicts the inputted picture features through the status information, and the status information is information for updating based on the picture features of the face pictures that have been inputted.

In a possible implementation, when the first pictures are the face pictures, the prediction information is information for indicating whether the corresponding face pictures include the faces, or the prediction information is information for indicating whether the corresponding face pictures include the face images with the image qualities satisfying the quality conditions.

In a possible implementation, the recurrent network includes at least one of a bi-directional gated recurrent unit (BGRU), a gated recurrent unit (GRU) and a long short term memory (LSTM) network.

For example, the tenth layer of the image prediction model can be added with the bi-directional gated recurrent unit (BGRU), where a hidden unit is 256. When 2 face pictures respectively correspond to 2 face picture segments, the face pictures are successively inputted into the recurrent network according to the time sequence. The 2 face picture segments corresponding to a first face picture sample are inputted first. If the prediction result of the face picture segment includes face information, the prediction result corresponding to the face picture segment is 1, and otherwise, it is 0. When the 2 face picture segments both are predicted to have the face information, the prediction information corresponding to the first face picture is a vector of (1, 1).

In a possible implementation, the prediction results of the M face picture segments in the N face pictures are outputted by way of a sigmoid function adopted in the last layer of the image prediction model.

The prediction information may be an outputted logits value of M×Y, where M is the number of segments of an inputted image of the model, and Y is the prediction result of each segment, which is 0 or 1.

Figure 7:
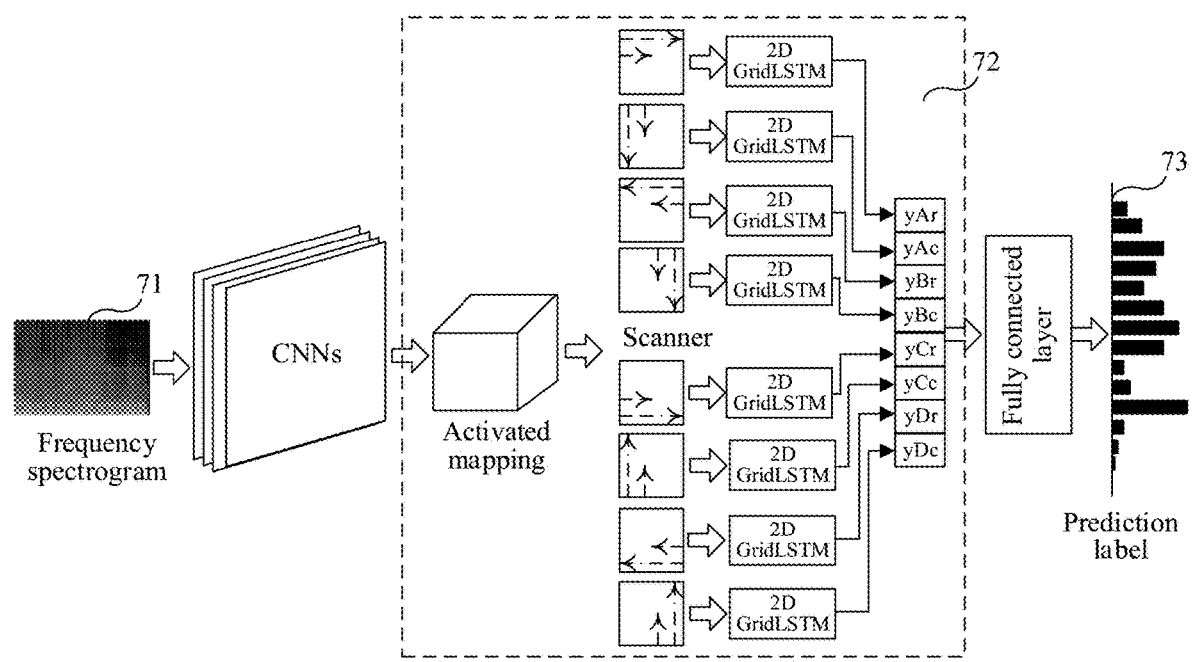
FIG. 7 is a schematic structural diagram of an image prediction module involved in the exemplary embodiment shown in FIG. 4.

For example, FIG. 7 is a schematic structural diagram of an image prediction model involved in the embodiments of this disclosure. As shown in FIG. 7, a frequency spectrogram 71 corresponding to the face picture is inputted into the convolutional layers for feature extraction, then the extracted features are outputted and calculated in time dimension by way of the recurrent network 72, and a prediction label 73 corresponding to the frequency spectrogram 71 is outputted by way of a fully connected layer.

In a possible implementation, the prediction information includes prediction sub-information of the M first picture segments of the corresponding first pictures, the prediction sub-information being used for indicating prediction results of the corresponding first picture segments.

In S411, the N first pictures are spliced with the corresponding prediction information to generate encrypted picture data of the N first pictures.

In the embodiments of this disclosure, the computer device may splice the N first pictures with the corresponding prediction information to obtain the encrypted picture data of the N first pictures.

The computer device may splice the N face pictures with the corresponding prediction information to obtain the encrypted picture data of the N face pictures.

In a possible implementation, the N face pictures are spliced with the prediction information based on a target data structure to generate the encrypted N face pictures.

Exemplarily, the target data structure may be the encrypted face pictures generated by splicing in format of {prediction information} {payload}, where payload is the face data corresponding to the face pictures.

In another possible implementation, the N face pictures are spliced with the prediction information and attribute information of the face data based on the target data structure to generate the encrypted N face pictures.

In a possible implementation, the attribute information of the face data includes at least one of timestamp, counter information (counter), magic number information (magic_num), device model information (device_info), signature algorithm edition information (sign_version) and random number information (random).

Exemplarily, the target data structure may be the encrypted face pictures generated by splicing in format of {magic_num} {device_info} {sign_version} {timestamp} {counter} {prediction information} {random} {payload}.

In conclusion, after the first pictures having the time sequence are subjected to feature extraction, the first pictures are subjected to target prediction to obtain the prediction information corresponding to the first pictures, and the first pictures are encrypted based on the prediction information corresponding to the first picture. Prediction is performed through the updated status information of the picture features of the first pictures that has been predicted, so as to obtain current prediction information that predicts the picture features of the first pictures. Through the above-mentioned solution, the prediction information of the first pictures is affected by considering relevance of the picture features of the first pictures in time dimension, so that a condition that a first image is easily cracked for an encryption format only introducing a non-neural network safety factor is avoided, and therefore, the safety of the encrypted first image is also improved while the encryption format that encrypts the first pictures is expanded.

Figure 8:
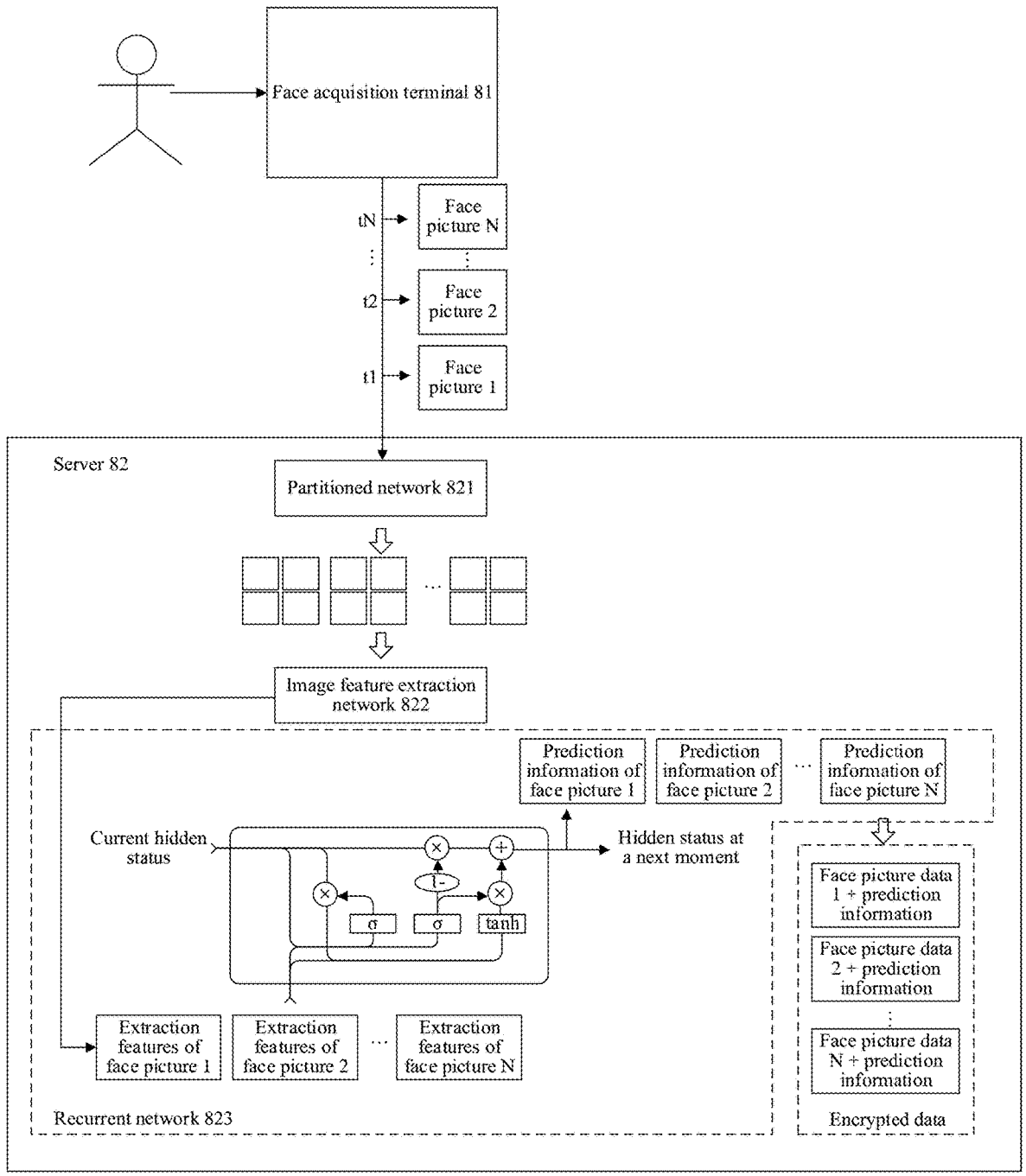
FIG. 8 is a schematic structural diagram of a face picture encryption system according to an exemplary embodiment.

FIG. 8 is a schematic structural diagram of a face picture encryption system according to an exemplary embodiment. As shown in FIG. 8, the face acquisition terminal 81 acquires the N face pictures of the user having the time sequence, and all or part of the N face pictures include the face images, where the N face pictures are the face picture 1 corresponding to a moment t1, the face picture 2 corresponding to a moment t2, . . . the face picture N corresponding to a moment tN. The N face pictures are transmitted to the server 82 and are partitioned through the partitioning network 821, the face picture segments have the attention weights correspondingly, and the face picture segments having the attention weights are inputted into the image feature extraction network 822. The image feature extraction network 822 includes the convolutional layer and the pooling layer. The extracted extraction features corresponding to the N face pictures are inputted into the recurrent network 823 according to the time sequence, the hidden status corresponding to the next moment and the prediction information corresponding to the face picture 1 are outputted based on the extraction feature corresponding to the face picture 1 and the hidden status of the current BGRU unit, and then the hidden status corresponding to the next moment and the prediction information corresponding to the face picture 2 are outputted based on the extraction feature corresponding to the face picture 2 and the hidden status of the processed face picture 1 till the prediction information corresponding to the face picture N is outputted completely, and the picture data of the N face pictures are spliced with the corresponding prediction information to generate the encrypted face pictures.

In conclusion, after the first pictures having the time sequence are subjected to feature extraction, the first pictures are subjected to target prediction to obtain the prediction information corresponding to the first pictures, and the first pictures are encrypted based on the prediction information corresponding to the first picture. Prediction is performed through the updated status information of the picture features of the first pictures that has been predicted, so as to obtain current prediction information that predicts the picture features of the first pictures. Through the above-mentioned solution, the prediction information of the first pictures is affected by considering relevance of the picture features of the first pictures in time dimension, so that a condition that a first image is easily cracked for an encryption format only introducing a non-neural network safety factor is avoided, and therefore, the safety of the encrypted first image is also improved while the encryption format that encrypts the first pictures is expanded.

Figure 9:
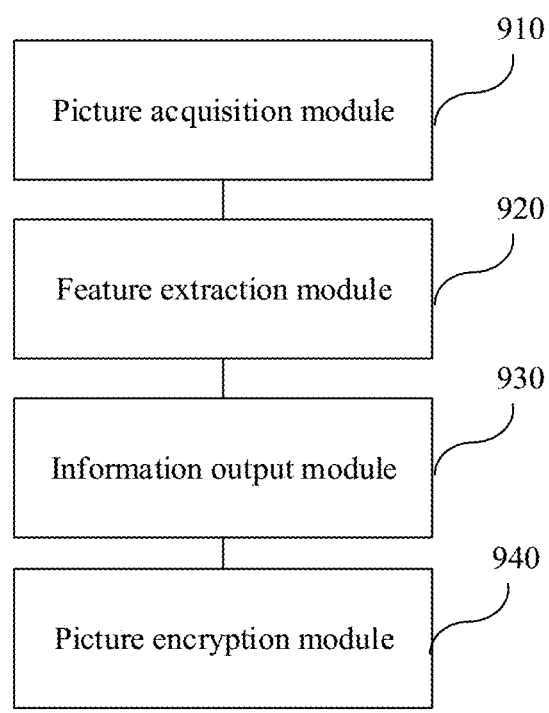
FIG. 9 is a block diagram of a picture encryption apparatus illustrated by an exemplary embodiment.

FIG. 9 is a block diagram of a picture encryption apparatus according to an exemplary embodiment. In this disclosure, a unit and a module may be hardware such as a combination of electronic circuitries; firmware; or software such as computer instructions. The unit and the module may also be any combination of hardware, firmware, and software. In some implementation, a unit may include at least one module. As shown in FIG. 9, the picture encryption apparatus may include:

- a picture acquisition module 910 configured to acquire N first pictures having a time sequence, where N is an integer equal to or greater than 2;
- a feature extraction module 920 configured to perform feature extraction on the N first pictures to acquire picture features of the N first pictures;
- an information output module 930 configured to successively perform target prediction on the N first pictures according to the time sequence to obtain prediction information of the N first pictures, where the target prediction refers to prediction on the first pictures based on status information, and the status information is information for updating based on the picture features of the first pictures that have been predicted; and
- a picture encryption module 940 configured to encrypt the N first pictures based on the prediction information of the N first pictures.

In a possible implementation, the information output module 930 includes:
- an information output sub-module configured to successively input the picture features of the N first pictures into a recurrent network in an image prediction model according to the time sequence to obtain the prediction information of the N first pictures outputted by the recurrent network.

In a possible implementation, the apparatus further includes:
- an picture segment acquisition module configured to, through a partitioning network in the image prediction model, perform partitioning processing on the N first pictures according to a size of a target window to acquire M first picture segments corresponding to the N first pictures before the performing feature extraction on the N first pictures to acquire picture features corresponding to the N first pictures, where M is an integer equal to or greater than 1, and the size of the target window is a network parameter of the partitioning network; and
the feature extraction module 920 includes:
- a feature extraction sub-module configured to perform feature extraction on the M first picture segments of the N first pictures based on attention weights of the M first picture segments to obtain picture features of the N first pictures.

In a possible implementation, the prediction information includes prediction sub-information of the M first picture segments of the corresponding first pictures, the prediction sub-information being used for indicating prediction results of the first picture segments.

In a possible implementation, the feature extraction sub-module includes:
- a feature preprocessing unit for preprocessing the M first picture segments of a target picture to obtain preprocessed features of the M first picture segments of the target picture, where the target picture is any one of the N first pictures; and
- a target feature acquisition unit for inputting the preprocessed features of the M first picture segments of the target picture into an image feature extraction network in the image prediction model to obtain the picture feature of the target picture outputted by the image feature extraction network,
where the image feature extraction network includes an attention mechanism layer used for processing the preprocessed features of the M first picture segments by taking the attention weights of the M first picture segments as parameters.

In a possible implementation, the feature preprocessing unit is configured to:
- acquire a gray value of a target picture segment, where the target picture segment is any one of the M first picture segments corresponding to the target picture;
- acquire first type feature information of the target picture segment based on fast Fourier transform of a first order of magnitude; and
- combine the gray value of the target picture segment with the first type feature information of the target picture block to obtain a preprocessed feature of the target picture segment.

In a possible implementation, the first type feature information includes:
- at least one of energy distribution feature information, high and low frequency distribution feature information, flatness feature information and spectral centroid feature information of an image frequency spectrogram.

In a possible implementation, the apparatus further includes:
- a training data acquisition module configured to acquire training data before acquiring N first pictures with a time sequence, where the training data includes K picture samples having a time sequence and annotated information of the K picture samples, K being an integer equal to or greater than 2;
- a sample feature extraction module configured to perform feature extraction on the K picture samples to acquire picture features corresponding to the K picture samples;
- a sample prediction information acquisition module configured to successively input the picture features corresponding to the K picture samples into the recurrent network in the image prediction model according to the time sequence to obtain the prediction information of the K picture samples outputted by the recurrent network;
- a sample prediction result acquisition module configured to acquire prediction results of the K picture samples based on the prediction information of the K picture samples;
- a loss function value acquisition module configured to acquire a loss function value based on the prediction results of the K picture samples and the annotated information of the K picture samples; and a model updating module configured to update the image prediction model based on the loss function value.

In a possible implementation, the model updating module includes:

a parameter updating sub-module configured to perform parameter updating on at least one network of the recurrent network, the partitioning network and the image feature extraction network based on the loss function value.

In a possible implementation, the recurrent network includes:

at least one of a bi-directional gated recurrent unit (BGRU), a gated recurrent unit (GRU) and a long short term memory (LSTM) network.

In a possible implementation, the picture encryption module 940 includes:

a picture encryption sub-module configured to splice the N first pictures with the corresponding prediction information to generate encrypted picture data of the N first pictures.

In a possible implementation, all or part of pictures in the N first pictures include face images.

In a possible implementation, the prediction information is used for indicating whether the first pictures include the face images with image qualities satisfying quality conditions.

In conclusion, after the first pictures having the time sequence are subjected to feature extraction, the first pictures are subjected to target prediction to obtain the prediction information corresponding to the first pictures, and the first pictures are encrypted based on the prediction information corresponding to the first picture. Prediction is performed through the updated status information of the picture features of the first pictures that has been predicted, so as to obtain current prediction information that predicts the picture features of the first pictures. Through the above-mentioned solution, the prediction information of the first pictures is affected by considering relevance of the picture features of the first pictures in time dimension, so that a condition that a first image is easily cracked for an encryption format only introducing a non-neural network safety factor is avoided, and therefore, the safety of the encrypted first image is also improved while the encryption format that encrypts the first pictures is expanded.

Figure 10:
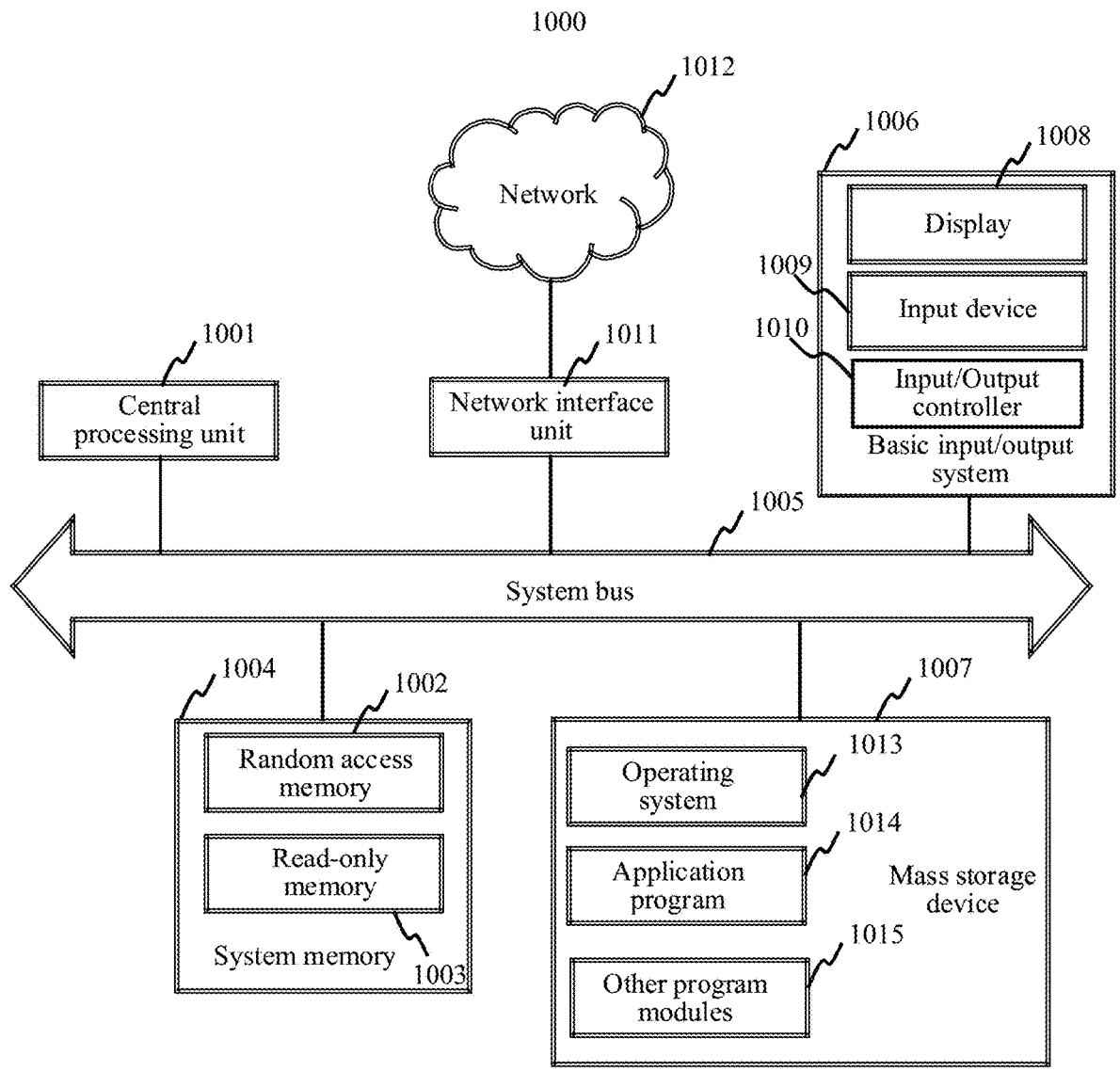
FIG. 10 is a schematic structural diagram of a computer device according to an exemplary embodiment.

FIG. 10 is a schematic structural diagram of a computer device according to an exemplary embodiment. The computer device 1000 includes a central processing unit (CPU) 1001, a system memory 1004 including a random access memory (RAM) 1002 and a read-only memory (ROM) 1003, and a system bus 1005 connecting the system memory 1004 to the CPU 1001. The computer device 1000 further includes a basic input/output (I/O) system 1006 assisting in transmitting information between components in a computer device, and a mass storage device 1007 configured to store an operating system 1013, an application program 1014, and another program module 1015. Similarly, the input/output controller 1010 further provides output to a display screen, a printer, or other types of output devices.

According to the embodiments of this disclosure, the computer device 1000 may further be connected, through a network such as the Internet, to a remote computer device on the network. That is, the computer device 1000 may be connected to a network 1012 by using a network interface unit 1011 connected to the system bus 1005, or may be connected to another type of network or a remote computer device system (not shown) by using a network interface unit 1011.

The memory further includes one or more programs. The one or more programs are stored in the memory. The CPU 1001 executes the one or more programs to implement all or some steps of the method shown in FIG. 3 or FIG. 4.

Figure 11:
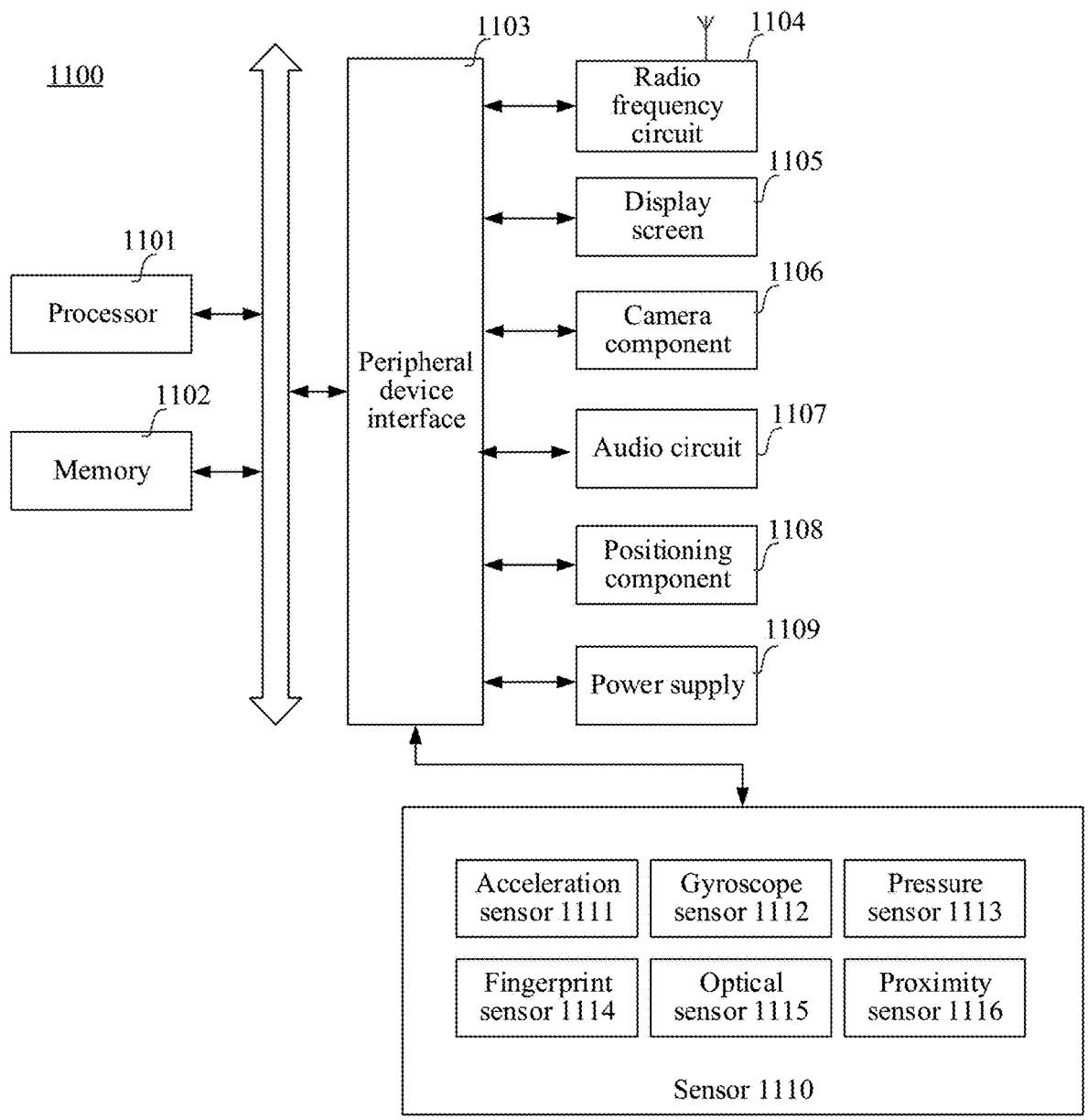
FIG. 11 is a structural block diagram of a computer device according to an exemplary embodiment.

FIG. 11 is a structural block diagram of a computer device 1100 according to an exemplary embodiment. The computer device 1100 may be the terminal in the image recognition system shown in FIG. 1.

Generally, the computer device 1100 includes a processor 1101 and a memory 1102.

In some embodiments, the processor 1101 may further include an artificial intelligence (AI) processor. The AI processor is configured to process computing operations related to machine learning.

The memory 1102 may include one or more computer-readable storage media that may be non-transitory. In some embodiments, the non-transitory computer-readable storage medium in the memory 1102 is configured to store at least one instruction, and the at least one instruction being configured to be executed by the processor 1101 to implement the method provided in the method embodiments of this disclosure.

In some embodiments, the computer device 1100 further optionally includes a peripheral interface 1103 and at least one peripheral. The processor 1101, the memory 1102, and the peripheral interface 1103 may be connected through a bus or a signal cable. Each peripheral may be connected to the peripheral interface 1103 through a bus, a signal cable, or a circuit board. Specifically, the peripheral includes at least one of a radio frequency (RF) circuit 1104, a display screen 1105, a camera component 1106, an audio circuit 1107, a positioning component 1108, and a power supply 1109.

In some embodiments, the computer device 1100 further includes one or more sensors 1110. The one or more sensors 1110 include, but are not limited to, an acceleration sensor 1111, a gyroscope sensor 1112, a pressure sensor 1113, a fingerprint sensor 1114, an optical sensor 1115, and a proximity sensor 1116.

A person skilled in the art may understand that the structure shown in FIG. 11 does not constitute any limitation on the computer device 1100, and the computer device may include more components or fewer components than those shown in the figure, or some components may be combined, or a different component deployment may be used.

In an exemplary embodiment, a non-temporary computer-readable storage medium including an instruction is further provided, for example, a memory including at least one instruction, at least one program, a code set, or an instruction set. The at least one instruction, the at least one program, the code set, or the instruction set may be executed by a processor to implement all or some steps of the method shown in any embodiment in FIG. 3 or FIG. 4.

A person skilled in the art is to be aware that in the one or more examples, the functions described in the embodiments of this disclosure may be implemented by using hardware, software, firmware, or any combination thereof. When implemented by using software, the functions can be stored in a computer-readable medium or can be used as one or more instructions or code in a computer-readable medium for transmission. The computer-readable medium includes a computer storage medium and a communication medium, where the communication medium includes any medium that enables a computer program to be transmitted from one place to another. The storage medium may be any available medium accessible to a general-purpose or dedicated computer device.

According to an aspect of this application, a computer program product or a computer program is provided, the computer program product or the computer program including computer instructions, the computer instructions being stored in a non-transitory computer-readable storage medium. A processor of a computer device reads the computer instructions from the non-transitory computer-readable storage medium, and executes the computer instructions, so that the computer device performs the picture encryption method provided in the various optional implementations of the foregoing aspects.

Other embodiments of this disclosure will be apparent to a person skilled in the art from consideration of the specification and practice of this application here. This application is intended to cover any variation, use, or adaptive change of this application. These variations, uses, or adaptive changes follow the general principles of this application and include common general knowledge or common technical means in the art that are not disclosed in this application. The specification and the embodiments are considered as merely exemplary, and the scope and spirit of this application are pointed out in the following claims.

It is to be understood that this application is not limited to the precise structures described above and shown in the accompanying drawings, and various modifications and changes can be made without departing from the scope of this application. The scope of this application is subject only to the appended claims.

What is claimed is:

1. A method for picture encryption, executed by a computer device, the method comprising:
    acquiring N pictures having a time sequence, N being an integer equal to or greater than 2;
    performing feature extraction on the N pictures to acquire a picture feature of each of the N pictures;
    successively performing target prediction on the N pictures according to the time sequence to obtain prediction information of the each of the N pictures, the target prediction referring to a prediction on the each of the N pictures based on status information, and the status information being information which is updated based on picture features of pictures that have been predicted; and
    encrypting the N pictures based on the prediction information of the each of the N pictures.

2. The method according to claim 1, wherein successively performing the target prediction on the N pictures according to the time sequence to obtain the prediction information of the each of the N pictures comprises:
    successively inputting the picture feature of the each of the N pictures into a recurrent network in an image prediction model according to the time sequence to obtain the prediction information of the each of the N pictures outputted by the recurrent network.

3. The method according to claim 2, wherein before performing the feature extraction on the N pictures, the method further comprises:
    through a partitioning network in the image prediction model, performing partitioning processing on the N pictures according to a size of a target window to acquire M picture segments for each of the N pictures, wherein M is a positive integer, and the size of the target window is a network parameter of the partitioning network; and
    performing the feature extraction on the N pictures to acquire the picture feature of the each of the N pictures comprises:
    for the each of the N pictures, performing feature extraction on the M picture segments based on attention weights each corresponding to one of the M picture segments to obtain the picture feature of the each of the N pictures.

4. The method according to claim 3, wherein the prediction information comprises prediction sub-information for indicating prediction result of the each of the M picture segments of the each of the N pictures.

5. The method according to claim 3, wherein performing the feature extraction on the M picture segments comprises:
    preprocessing the M picture segments to obtain preprocessed features of the M picture segments; and
    inputting the preprocessed features of the M picture segments into an image feature extraction network in the image prediction model to acquire the picture feature of the each of the N pictures outputted by the image feature extraction network,
    wherein the image feature extraction network comprises an attention mechanism layer used for processing the preprocessed features of the M picture segments by taking the attention weights of the M picture segments as parameters.

6. The method according to claim 5, wherein preprocessing the M picture segments to obtain the preprocessed features of the M first picture segments comprises:
    acquiring a gray value of the each of the M picture segments;
    acquiring first type feature information of the each of the M picture segments based on a fast Fourier transform of a first order of magnitude; and
    combining the gray value with the first type feature information to obtain the preprocessed feature of the each of the M picture segments.

7. The method according to claim 6, where the first type feature information comprises at least one of following information of a spectrogram of the each of the M picture segments:
    an energy distribution feature information;
    a high and low frequency distribution feature information;
    a flatness feature information; or
    a spectral centroid feature information.

8. The method according to claim 5, wherein before acquiring the N pictures, the method further comprises:
    acquiring training data, wherein the training data comprises K picture samples having a time sequence and annotated information of the K picture samples, K being an integer equal to or greater than 2;
    performing feature extraction on the K picture samples to acquire picture features corresponding to the K picture samples;
    successively inputting the picture features corresponding to the K picture samples into a recurrent network in the image prediction model according to the time sequence to obtain prediction information of the K picture samples outputted by the recurrent network;
    acquiring prediction results of the K picture samples based on the prediction information of the K picture samples;
    acquiring a loss function value based on the prediction results of the K picture samples and the annotated information of the K picture samples; and
    updating the image prediction model based on the loss function value.

9. The method according to claim 8, wherein updating the image prediction model based on the loss function value comprises:
performing parameter updating on at least one of: the recurrent network, the partitioning network, or the image feature extraction network based on the loss function value.

10. The method according to claim 2, wherein the recurrent network comprises at least one of:
a bi-directional gated recurrent unit (BGRU);
a gated recurrent unit (GRU); or
a long short term memory (LSTM) network.

11. The method according to claim 1, wherein encrypting the N pictures based on the prediction information of the each of the N pictures comprises:
splicing the each of the N pictures with the corresponding prediction information to obtain spliced data; and
encrypting the spliced data to generate encrypted picture data of the N pictures.

12. The method according to claim 1, wherein all or part of pictures in the N pictures comprise face images.

13. The method according to claim 12, wherein the prediction information is used for indicating whether the each of the N pictures comprising a face image meeting a quality requirement.

14. The method according to claim 12, wherein the N pictures are pictures acquired successively according to the time sequence in a face image based identity recognition process.

15. A device for picture encryption, the device comprising a memory for storing computer instructions and a processor in communication with the memory, wherein, when the processor executes the computer instructions, the processor is configured to cause the device to:
acquire N pictures having a time sequence, N being an integer equal to or greater than 2;
perform feature extraction on the N pictures to acquire a picture feature of each of the N pictures;
successively perform target prediction on the N pictures according to the time sequence to obtain prediction information of the each of the N pictures, the target prediction referring to a prediction on the each of the N pictures based on status information, and the status information being information which is updated based on picture features of pictures that have been predicted; and
encrypt the N pictures based on the prediction information of the each of the N pictures.

16. The device according to claim 15, wherein, when the processor is configured to cause the device to successively perform the target prediction on the N pictures according to the time sequence to obtain the prediction information of the each of the N pictures, the processor is configured to cause the device to:
successively input the picture feature of the each of the N pictures into a recurrent network in an image prediction model according to the time sequence to obtain the prediction information of the each of the N pictures outputted by the recurrent network.

17. The device according to claim 16, wherein, before the processor is configured to cause the device to perform the feature extraction on the N pictures, the processor is configured to further cause the device to:
through a partitioning network in the image prediction model, perform partitioning processing on the N pictures according to a size of a target window to acquire M picture segments for each of the N pictures, wherein M is a positive integer, and the size of the target window is a network parameter of the partitioning network; and
perform the feature extraction on the N pictures to acquire the picture feature of the each of the N pictures comprises:
for the each of the N pictures, perform feature extraction on the M picture segments based on attention weights each corresponding to one of the M picture segments to obtain the picture feature of the each of the N pictures.

18. The device according to claim 17, wherein the prediction information comprises prediction sub-information for indicating prediction result of the each of the M picture segments of the each of the N pictures.

19. A non-transitory storage medium for storing computer readable instructions, the computer readable instructions, when executed by a processor, causing the processor to:
acquire N pictures having a time sequence, N being an integer equal to or greater than 2;
perform feature extraction on the N pictures to acquire a picture feature of each of the N pictures;
successively perform target prediction on the N pictures according to the time sequence to obtain prediction information of the each of the N pictures, the target prediction referring to a prediction on the each of the N pictures based on status information, and the status information being information which is updated based on picture features of pictures that have been predicted; and
encrypt the N pictures based on the prediction information of the each of the N pictures.

20. The non-transitory storage medium according to claim 19, wherein, wherein, when the computer readable instructions cause the processor to successively perform the target prediction on the N pictures according to the time sequence to obtain the prediction information of the each of the N pictures, the computer readable instructions cause the processor to:
successively input the picture feature of the each of the N pictures into a recurrent network in an image prediction model according to the time sequence to obtain the prediction information of the each of the N pictures outputted by the recurrent network.

* * * * *